(12) United States Patent
Tilwani

(10) Patent No.: US 8,549,472 B1
(45) Date of Patent: Oct. 1, 2013

(54) SYSTEM AND METHOD FOR WEB DESIGN

(75) Inventor: Prakash Tilwani, Commerce City, CO (US)

(73) Assignee: Fair Isaac Corporation, Minneapolis, MN (US)

( * ) Notice: Subject to any disclaimer, the term of this patent is extended or adjusted under 35 U.S.C. 154(b) by 1377 days.

(21) Appl. No.: 11/761,681

(22) Filed: Jun. 12, 2007

(51) Int. Cl.
*G06F 9/44* (2006.01)
*G06F 17/00* (2006.01)
*G06F 15/16* (2006.01)

(52) U.S. Cl.
USPC ........... 717/109; 717/104; 717/105; 717/106; 715/206; 709/208

(58) Field of Classification Search
None
See application file for complete search history.

(56) References Cited

U.S. PATENT DOCUMENTS

| | | | | |
|---|---|---|---|---|
| 6,023,684 | A * | 2/2000 | Pearson | 705/36 R |
| 6,550,054 | B1 * | 4/2003 | Stefaniak | 717/104 |
| 7,103,627 | B2 * | 9/2006 | Kittredge et al. | 709/201 |
| 7,287,144 | B2 * | 10/2007 | Hama | 711/118 |
| 7,334,216 | B2 * | 2/2008 | Molina-Moreno et al. | 717/109 |
| 7,543,267 | B2 * | 6/2009 | Lindhorst et al. | 717/105 |
| 7,580,971 | B1 * | 8/2009 | Gollapudi et al. | 709/203 |
| 7,689,923 | B2 * | 3/2010 | Massasso et al. | 715/762 |
| 7,716,573 | B2 * | 5/2010 | Schwartz | 715/234 |
| 7,757,204 | B2 * | 7/2010 | Fildebrandt et al. | 717/104 |
| 7,827,527 | B1 * | 11/2010 | Chiluvuri | 717/109 |
| 2001/0037490 | A1 * | 11/2001 | Chiang | 717/2 |
| 2002/0184610 | A1 * | 12/2002 | Chong et al. | 717/109 |
| 2003/0023641 | A1 * | 1/2003 | Gorman et al. | 707/530 |
| 2004/0205695 | A1 * | 10/2004 | Fletcher | 717/105 |
| 2004/0237066 | A1 * | 11/2004 | Grundy et al. | 717/104 |
| 2005/0076329 | A1 * | 4/2005 | Hsu et al. | 717/105 |
| 2005/0188349 | A1 * | 8/2005 | Bent et al. | 717/106 |
| 2005/0204347 | A1 * | 9/2005 | Jurkiewicz et al. | 717/137 |
| 2005/0256665 | A1 * | 11/2005 | Hartmann et al. | 702/121 |
| 2005/0256882 | A1 * | 11/2005 | Able et al. | 707/10 |
| 2006/0041890 | A1 * | 2/2006 | Pik et al. | 719/315 |
| 2006/0117294 | A1 * | 6/2006 | Vogler | 717/104 |
| 2006/0168115 | A1 * | 7/2006 | Loupia et al. | 709/218 |
| 2006/0265662 | A1 * | 11/2006 | Gertzen | 715/760 |
| 2007/0074178 | A1 * | 3/2007 | Schwartz | 717/136 |
| 2007/0079282 | A1 * | 4/2007 | Nachnani et al. | 717/106 |
| 2007/0198968 | A1 * | 8/2007 | Shenfield et al. | 717/104 |
| 2007/0240041 | A1 * | 10/2007 | Pearson | 715/522 |
| 2008/0052367 | A1 * | 2/2008 | Liu et al. | 709/208 |
| 2009/0313601 | A1 * | 12/2009 | Baird et al. | 717/106 |

OTHER PUBLICATIONS

Volker Turau, "A framework for automatic generation of webbased data entry applications based on XML", [Online], ACM 2002, pp. 1-7, [Retrieved from Internet on Jun. 1, 2013], <http://delivery.acm. org/10.1145/510000/509011/p1121-turau.pdf>.*

Marcello Dalpasso et al., "Specification and validation of distributed IP-based designs with JavaCAD", [Online], ACM 1999, p. 1-5, [Retrieved from Internet on Jun. 1, 2013], <http://delivery.acm.org/10.1145/310000/307588/00780684.pdf>.*

(Continued)

*Primary Examiner* — Thuy Dao
*Assistant Examiner* — Ziaul A Chowdhury
(74) *Attorney, Agent, or Firm* — Fulbright & Jaworski LLP

(57) ABSTRACT

A system for creating an application comprises a user interface receiving user interaction that specifies visual properties and actions of a web application, and a code unit generating application data that describes the specified visual properties and actions of the web application.

18 Claims, 10 Drawing Sheets

(56) References Cited

OTHER PUBLICATIONS

Ye Wu and Jeff Offutt, "Modeling and Testing Web-based Applications", [Online], 2002, pp. 1-12, [Retrieved from Internet on Jun. 1, 2013], <http://www.cs.gmu.edu/~offutt/rsrch/papers/webmodeltr.pdf>.*

Jochen Rode et al. "Programming at Runtime: Requirements & Paradigms for Nonprogrammer Web Application Development", [Online], IEEE 2003, pp. 23-30, [Retrieved from Internet on Jun. 1, 2013], <http://ieeexplore.ieee.org/stamp/stamp.jsp?tp=&arnumber=1260198>.*

"building XML Data-Driven Web Sites with FrontPage 2003", Microsoft Office FrontPage 2003 Technical Article by Paul Litwin, Microsoft Corporation, Copyright © 2007 [Retrieved on: Jun. 12, 2007] Retrieved from: http://msdn2.microsoft.com/en-us/library/aa218643(office.11,d=printer),aspx.

* cited by examiner

FIG. 7A

```xml
<?xml version="1.0" encoding="utf-8" ?>                                          /— 700
- <ui:page master-page="HomePageMaster" master-cell-ref="page1"
    Xmlns:ui=http://FIC.Framework.UI.Pagebuilder/schema/PageSpecification>
```
702a — `<controls>`
```
    <control ID="breadcrumb" Type="breadcrumb" PageContextKey="HomePage" PageId="12'
      CurrentPageStyleClass="CurrentPageStyleClass" Separator=">"
      ControlStyleClass="ControlStyleClass" LinkTextStyleClass="LinkTextStyleClass"
      LabelTextStyleClass="LabelTextStyleClass"/>
    <control ID="img1" Type="image"
      ImageUrl="~/Application/Images/LCAP/content/table_corner_btm.gif" />
    <control ID="img2" Type="image"
      ImageUrl="~/Application/Images/LCAP/content/table_corner_lb.gif" />
    <control ID="img3" Type="image"
      ImageUrl="~/Application/Images/LCAP/content/table_corner_rb.gif" />
    <control ID="img4" Type="image"
      ImageUrl="~/Application/Images/LCAP/content/table_corner_lt.gif" />
    <control ID="img5" Type="image"
      ImageUrl="~/Application/Images/LCAP/content/table_corner_rt.gif" />
    <control ID="img6" Type="image"
      ImageUrl="~/Application/Images/LCAP/content/table_top_border.gif" />
    <control ID="imgl" Type="image"
      ImageUrl="~/Application/Images/LCAP/content/table_border.gif" />
    <control ID="imgr" Type="image"
      ImageUrl="~/Application/Images/LCAP/content/table_border.gif" />
    <control ID="blank" Type="label" Text=" " />
    <control ID="acHeading" Type="label" Text="App Copy Setup Details" />
    <control ID="acCopyFromListLabel" Type="label" Text="App copy form from: " />
    <control ID="acCopyFromList" Type="dropdown" />
    <control ID="acCopySelectedFieldsCheckbox" Type="checkbox" Text=" Copy
      Selected Fields" CssClass="checkbox" />
    <control ID="shuttlelist" Type="shuttlelist" MoveOneButtonText="Add >"
      MoveAllButtonText="Add All > >" RemoveOneButtonText="<Remove"
      RemoveAllButtonText="< < Remove All" MoveButtonStyle="bttn_blu" SourceStyle="multi
      TargetStyle="multi" SourceHolderStyle="SourceListHolder"
      TargetHolderStyle="TargetListHolder" ListItemEvenRowStyleClass="evenrow"
      ListItemOddRowStyleClass="oddrow" />
    <control ID="submit" Type="button" Text="Submit" CommandName="submit
      CssClass="w71" />
    <control ID="cancel" Type="button" Text="Cancel" CommandName="cancel"
      CssClass="w71" />
    <control ID="_pageId" Type="hidden" Value="App Copy Setup Details" />
```
702b — `</controls>`
703a — `<layout>`
```
    - <section ID="dupChecking">
      - <layoutManager>
          <vertical styleClass="fullWidth" />
      -</layoutManager>
    -<content>
      <!- -bread crumb - ->
      <cell id="breadcrumbSection" location="1" control-ref="breadcrumb" />
      -   <section id="borderTable" location="2" styleClass="fullWidth centerAlign">
          -</layoutManager>
            <grid rows="3" cols="3" styleClass="formtable" />
          </layoutManager>
        - <content>
            <cell id="cornerlt" location="(1,1)-(1,1)" control-ref="img4"/>
            <cell id="top" location="(1,2)-(1,2)" control-ref="img6"
              styleClass="bg_top" />
            <cell id="cornerrt" location="(1,3)-(1,3)" control-ref="img5" />
```

FIG. 7B

```
          <cell id="left" location="(2,1_-(2,1)" control-ref="imgl"
             styleClass="bg_vertical"/>
        - <section id="dupCheckBody" location=(2,2)-(2,2)" styleClass="fullWidth">      /~ 700
          - <layoutManager>
              <vertical styleClass="fullWidth"/>
            </layoutManager?
          - <content>
              <cell id="acHeadingSection" location="1" control-ref="acHeading"
                 styleClass="category_title bold_text" />
             -<section id="data" location="2" styleClass="paddingTop10">
              -<layoutManager>
                 <vertical styleClass="fullWidth" />
                </layoutManager>
              - <content>
                - <section id="acCopyFromData" location="1"
                    styleClass="paddingTop10">
                  - <layoutManager>
                      <horizontal />
                    </layoutManager>
                  - <content>
                      <cell id="acCopyFormLblSec" location="1" control-
                         ref="acCopyFromListLabel" styleClass="right_label
                         horizontalPadding30" />
                      <cell id="acCopyFromList" styleClass="lst_150" />
                    <content>
                    </section>
                 -<section id="acCopySetupData" location="2"
                    styleClass="paddingTop10 centerAlign">
                  - <layoutManager>
                      <vertical />
                    </layoutManager>
                  - <content>
                      <cell id="acCopySelectedFieldsCheckboxSec"
                         location="1" control-
                         ref="acCopySelectedFieldsCheckbox"
                         styleClass="left_label verticalPadding10" />
                      <cell id="acSetupSec" control-ref="shuttlelist"
                         location="2" />
                    </content>
                  </section>
                </content>
              </section>
            - <section id="buttons" location="3" styleClass="centerAlign">
              - <layoutManager>
                  <horizontal />
                </layoutManager>
              - <content>
                  <cell id="submitSection" location="1" control-ref="submit"
                    styleClass="horizontalPadding10" />
                  <cell id="cancelSection" location="2" control-ref="cancel" />
                </content>
              </section>
              <cell id="pageId" control-ref="_pageId" location="4" />
            </content>
          </section>
          <cell id="right" location="(2,3)-(2,3)" control-ref="imgr"
             styleClass="bg_vertical" />
```

```
            <cell id="cornerlb" location="(3,1)-(3,1)" control-ref="img3" />
            <cell id="bottom" location="(3,2)-(3,2)" control-ref="img1"
              styleClass="bg_bottom" />
            <cell id="cornerrb" location="(3,3)-(3,3)" control-ref="img2" />
          </content>
        </section>
      </content>
    </section>
703a ⟶ </layout>
  </ui:page>
```

US 8,549,472 B1

SYSTEM AND METHOD FOR WEB DESIGN

TECHNICAL FIELD

The present description is related to web applications and, more specifically, to the creation and implementation of web applications.

BACKGROUND OF THE INVENTION

Currently, web applications are ubiquitous. They include applications that can be displayed by a browser, such as Firefox™, available from Mozilla Foundation, and can be accessed over a computer network, such as the Internet or a private network, without having to be installed on a local computer.

Prior art web application development usually conforms to the following pattern. A customer who desires to make a change to a web application user interface approaches a company that created and supplied the web application. The customer speaks with designers and developers about specific desires for the application. A designer then creates a mock-up, usually using a Hypertext Markup Language (HTML) tool to specify the visual look and feel of the web application. A developer then receives the mock-up and writes code to implement the desired functionality of the web application. Typically, the developer will write HTML code for the layout of the application and write JAVA and C++ or .NET and C# code for the functionality of the program. The developer generally does not use the code from the mock-up, starting from scratch instead. The developer then sends the application back to the designer to fix any visual discrepancies between the versions. There may be several iterations before a final version is ready for the customer's review.

Discarding the designer's mock up is somewhat wasteful. This is especially true in light of the fact that the designer is used again later in the process to fix the discrepancies in the developer's version. However, this process has grown up organically due to the fact that changes to the web application generally require significant programming skills. Currently, there is no application development environment that allows a designer or other person with few (or no) coding skills to create the functionality and visual aspects of a web application.

BRIEF SUMMARY OF THE INVENTION

Various embodiments of the present invention are directed to a systems, methods, and computer program products which include a Graphical User Interface (GUI) that allows a user to interact therewith to specify the visual and functional qualities of a web application. Thus, a designer can create an application with full functionality, and by using the GUI, the designer can avoid writing any code. However, various embodiments do not preclude the possibility that a designer or a developer may write some code during the process.

Some embodiments further include a runtime engine that receives the code generated by the GUI and generates browser executable code therefrom during runtime. Further, web applications created according to one or more embodiments of the invention may conform to various architectures, including a Service Oriented Architecture (SOA).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 7A-C is an illustration of an exemplary XML and CSS code adapted according to one embodiment of the invention;

DETAILED DESCRIPTION OF THE INVENTION

Figure 1:
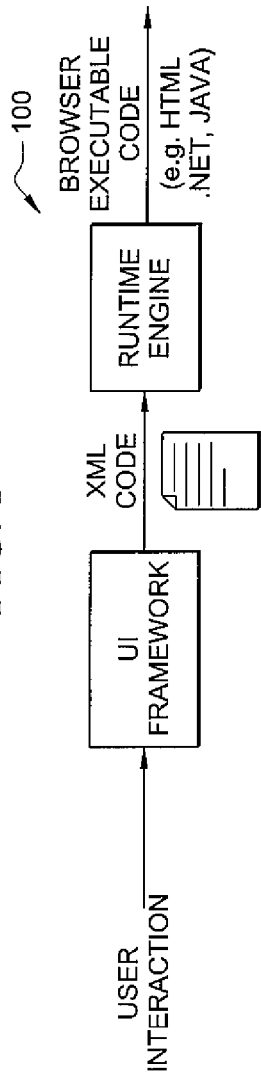
FIG. 1 is an illustration of an exemplary system adapted according to one embodiment of the invention.

FIG. 1 is an illustration of exemplary system 100 adapted according to one embodiment of the invention. System 100 includes User Interface (UI) Framework 101, which is a development environment for World Wide Web ("web") applications. Framework 101, in some embodiments, includes a Graphical User Interface (GUI) that receives user interaction that specifies the construction of a web application. Examples of user interaction include dragging and dropping objects onto a workspace to specify the layout, flow, and actions of the web application. However, user interaction is not limited to drag-and-drop operations, as will be seen in the following examples.

The output of framework 101 is a document with Extensible Markup Language (XML) data that includes information specifying the qualities of the web application. The XML data document is received by runtime engine 102 that is operable to extract the information in the XML data and to generate browser executable code based thereon. For example, the XML data may contain information specifying the layout, the flow, and even the actions of the web page, and runtime engine 102 uses the information to generate browser executable code. Browser executable code can include a variety of code defining the web application, such as HTML, .NET, JAVA, C#, and the like.

In many embodiments, a server (not shown) saves the XML data when it is made available, and runtime engine 102 (usually running on the server) generates the browser executable code in response to a browser's request. The browser receiving the browser executable code then executes the code and displays the web application for an end user.

Components 101 and 102 are, in some embodiments, software components that are executed by one or more computers. Components 101 and 102 may or may not be executed by the same computer. For example, in one embodiment, framework 101 is executed on a personal computer as a human user interacts with its interface, while runtime engine 102 is executed on a multi-processor computer adapted to be a web server.

Figure 2:
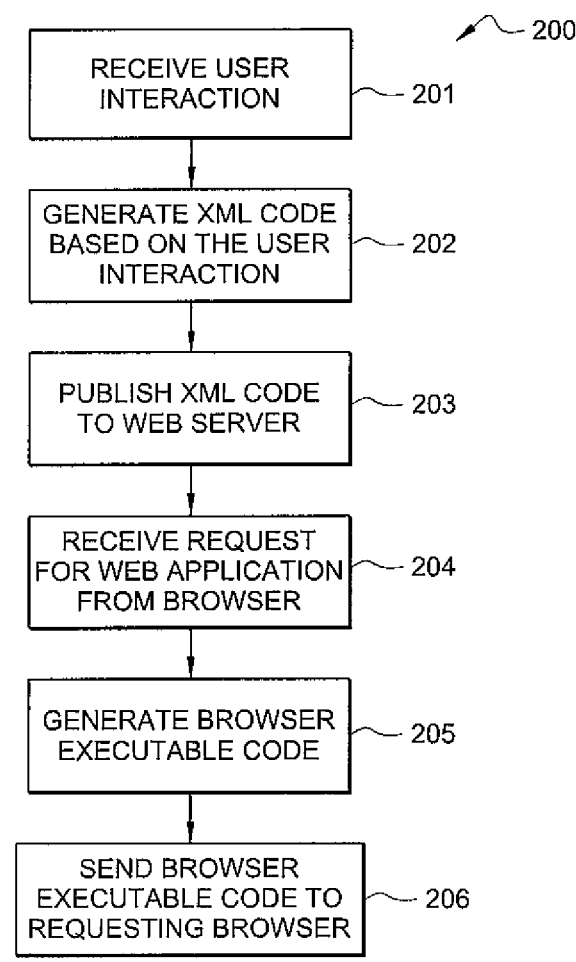
FIG. 2 is an illustration of an exemplary method adapted according to one embodiment of the present invention.

FIG. 2 is an illustration of exemplary method 200 adapted according to one embodiment of the present invention. In some embodiments, steps 201 and 202 are performed by a personal computer executing a web application development environment (e.g., framework 101 of FIG. 1), while steps 203-206 are performed by a web server computer that is executing a runtime engine (e.g., engine 102).

In step 201, the web application development environment receives user interaction, the interaction defining the qualities of a web application. The user interaction can include any kind of interaction, such as drag-and-drop object placement, cut-and-paste object placement, commands received from selected menu functions, answers in response to posed questions, and the like. In some embodiments, the interface is quite robust, such that a user may create a fully functional, multi-page, and interactive web application without having to actually write code. However, some embodiments may provide a text editor for a user to write or edit XML files.

In step 202, the web application development environment generates XML data based upon the user interaction. For example, the web application development environment may include logic therein that derives information from the user interaction and uses that information to draft XML data according to a given set of tag definitions that allow a runtime engine to process the XML data. In addition to XML data, the web application development environment may also generate accompanying data, such as Cascading Style Sheets (CSS) data, which often supplements XML data.

In step 203, the XML data is published to a web server as one or more XML files. In one example, the user considers the web application to be a finished product and posts it to a web server for others to access.

In step 204, the server receives a request for the web application from a browser. For example, an end user on the Internet or other network may request one or more pages from the application. The request may come, for example, via Hypertext Transport Protocol (HTTP) over the network.

In step 205, the server generates browser executable code. In one example, a runtime engine running on the server accesses the XML data that corresponds to the requested part of the web application and translates it into another kind of code. In some examples, the runtime engine generates ASP.NET code, HTML code, or Java Server Page (JSP) code to describe the look of the web application and also generates code (JAVA, .NET, and the like) to provide the logical flow and actions of the web applications.

In step 206, the server sends the browser executable code to the requesting browser. It should be noted that while the example of FIG. 2 specifies the use of XML to craft the web application, various embodiments of the invention are not limited thereto. In fact, other embodiments may use any kind of code or data that can represent information defining a robust web application, such as browser executable code. For example, any of various types of data can be saved in a text file, the data defining the web application. However, XML is often a convenient choice because of its property allowing information to be defined.

Figure 3:
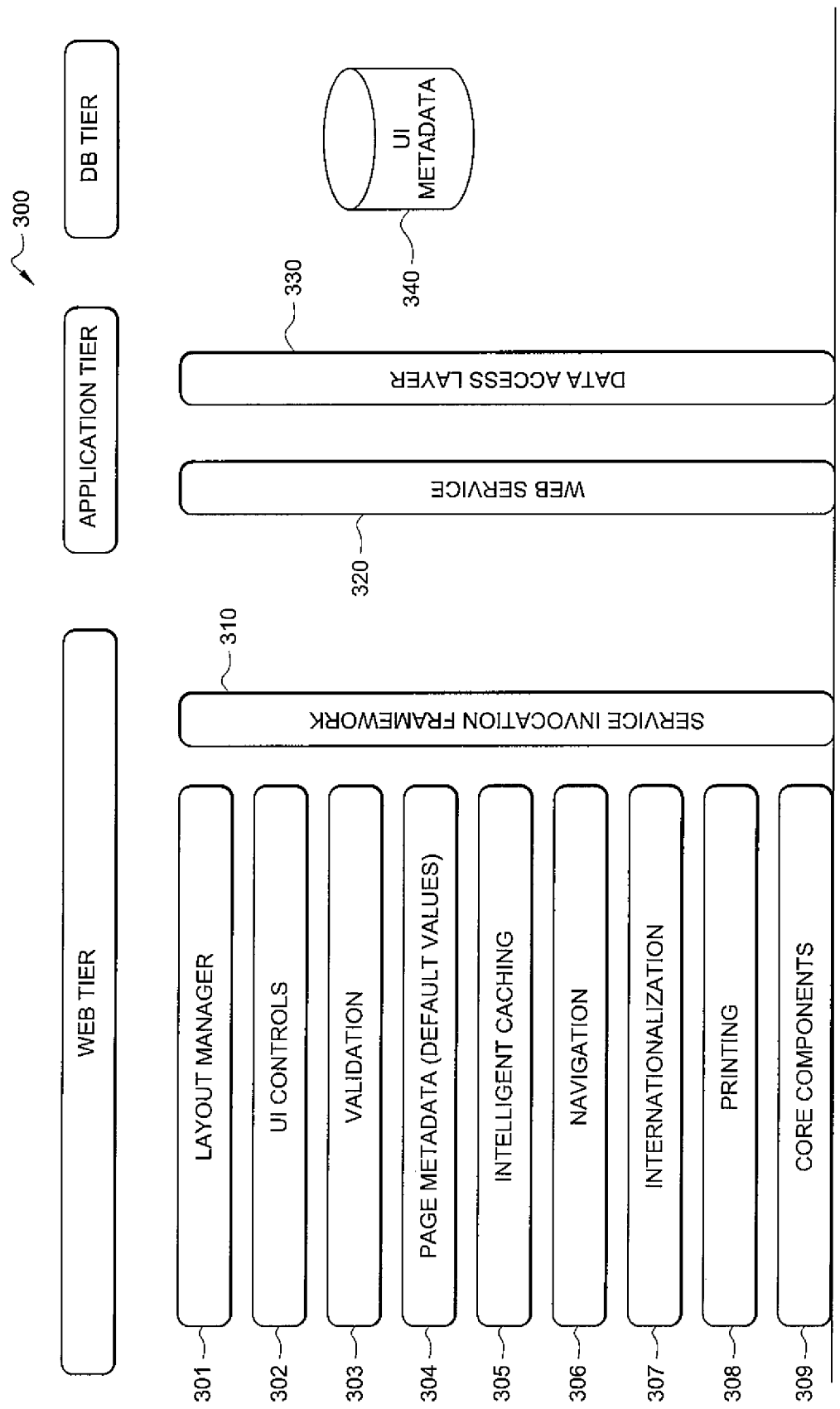
FIG. 3 is an illustration of an exemplary application architecture adapted according to one embodiment of the present invention.

FIG. 3 is an illustration of exemplary application architecture 300 adapted according to one embodiment of the present invention. Architecture 300 is one example of the form that a web application can take which conforms to a three 3-tiered Service Oriented Architecture (SOA). SOAs, such as that shown in FIG. 3, are considered advantageous because of their relative flexibility and security. However, various embodiments of the invention can incorporate other architectures.

As shown, architecture 300 is a three-tiered architecture wherein the user interface components of the code are defined on the machines that are on the Web Tier. The middle tier is the Application Tier that includes deployed logic components 320 and 330. Further, database 340 is deployed on the Database Tier.

The Web Tier includes a number of components that define how the web application looks, feels, and acts to a user. For example, the Web Tier includes layout manager 310 that is included in the runtime engine and is responsible for parsing the XML and generating the browser executable code therefrom.

User Interface (UI) controls 302 is a component which has a library of various controls. Examples of controls include a text box, a button, a list box, a data grid, a shadow box, a tab panel, and the like. The runtime engine includes controls from component 302 when generating browser executable code.

Validation component 303 has an XML file that specifies validations to be tied to different fields in the application. Validations include maximum and minimum numbers of characters for a text field, value specifications for numerical fields, and the like. Generally, when an end user of the web application enters a value in a field that does not conform to the validation, an error is returned. It should be noted that the XML file in component 303 is generally created by a user when interacting with a web application development environment.

Page metadata component 304 provides capabilities for displaying one or more lists of values (including default values) on the user interface. In this example, default values include values that appear on a screen before an end user enters information. The default values can be specified when interacting with the web application development environment.

Intelligent caching component 305 includes caching settings that define when and/or how often the runtime engine accesses the database that stores the configuration information that it receives. For example, consider a web application that is available to many users and receives thousands of hits per minute wherein end users view, enter, and/or change address information. If the runtime engine accesses the database with every hit, it may degrade performance by tying up the engine. On the other hand, if the runtime engine caches the database information and refreshes at a very low frequency, information may get stale. Accordingly, a middle ground may be useful. Intelligent caching component 305 not only caches database entries, but includes settings that specify when and/or how often the runtime engine should refresh the information, e.g., every 30 minutes. The settings can be entered by the user by interacting with the web application development environment.

Web Tier also includes navigation component 306. Navigation component 306 includes an XML file that specifies the logical flow of the web application. The logical flow of the application includes the ordering of the pages and the ordering of the actions in the application. For example, if an end user enters information into a text box and clicks on a button labeled "SUBMIT", the web application will usually progress to another page, such as a confirmation page. This progression is specified by information in navigation component 306. Navigation information can be entered by a user when interacting with the web application development environment.

Internationalization component 307 includes information to enable the application to present information for different languages and cultures. For instance, if an end user selects a tab labeled "DEUTCHE", the runtime engine will access internationalization component 307, which may include a German version of the web application or specify a location of a German version. It can also provide capabilities for displaying currency and time zones according to the locale. Once again, internationalization information can be entered by a user when interacting with the web application development environment.

Printing component 308 provides capabilities that allows an end user to print a printer-friendly version of one or more portions of the web application. Printing information can be entered by a user when interacting with the web application development environment (e.g., enabling printing, disabling printing, and the like).

Core components 309 includes other components that may be used for efficient design and maintenance of an application. For example, a web application may have a logging framework that records logins and/or incorrect attempts at login. The logging framework can be used to log such information to a database (e.g., database 340), a file, an email server, and/or the like. Components 309 may further include data encryption, managing exceptions, and the like.

Service invocation framework (SIF) 310 acts a bridge between the Web Tier and the Application Tier. In effect, SIF 310 is an abstraction layer between the UI and the business logic services on the application tier (e.g., web services) that makes UI agnostic to the business logic implementation (e.g., HTTP, TCP\IP, etc.). In one example, an end user accessing the application clicks a button to save an address to the database. The web application uses a web service from component 320 to pass the address information to the database. SIF 310 is used to pass the address information from the UI to the appropriate service. Additionally, when the web service returns a confirmation, SIF 310 passes the confirmation data to the runtime engine. In this way, SIF 310 performs the mapping between the Web Tier and web services 320. SIF 310, in some embodiments, is also used to manage a number of web services, such as Message Queues, Service Listening to TCP/IP, and the like.

In some embodiments, the functionality of SIF 310 is pre-coded and implemented into a given web application for a user. Further, some embodiments provide for such functionality to be specified in XML based on user interactions with the web application development environment, such that functionality can be added or modified by a user.

The Application Tier includes two components. First, is web services component 320, discussed above. Web services component 320 includes a variety of web services that are adapted to access database 340 (in read and write modes) on behalf of the Web Tier. Second is data access component 330, which includes code specifically adapted to access the database platforms (e.g., SQL Server™, Oracle™, DB2™) of database 340. Thus, database accesses go through data access component 330, thereby ensuring that accesses conform to the specific platform used. If a user desires to add or remove a database platform from the DB Tier, the user may employ the web application development environment to specify which database platforms are desired.

The third tier is the Database (DB) Tier, which includes database 340. Database 340 includes the business data that is accessed and/or modified, such as, e.g., user names and addresses, financial data, and the like. In addition to business data, system 300 can be configured such that database 340 includes the metadata for the application. For instance, the configuration information associated with modules 302-309 is stored in database 340, and components 302-309 direct the runtime engine to the appropriate entries.

Figure 4:
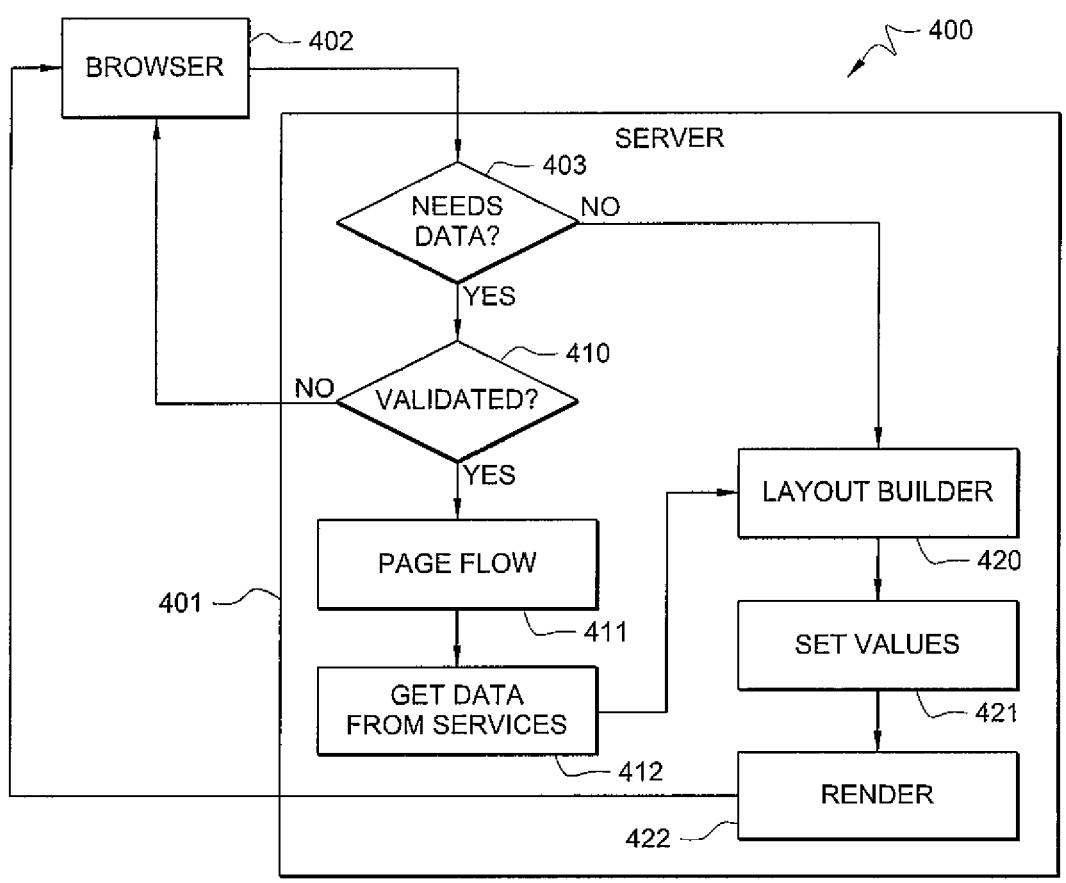
FIG. 4 is an illustration of an exemplary conceptual flow adapted according to one embodiment of the invention.

FIG. 4 is an illustration of exemplary conceptual flow 400 adapted according to one embodiment of the invention. Flow 400 shows the interaction between browser 402 and server 401, which executes the runtime engine. Flow 400 illustrates a scenario wherein an end user (as opposed to a user who is creating the web application) accesses the web application to read and/or write information in the database.

If the page requested by the end user at browser 402 does not specifically request any information to be retrieved from the database (in step 403), then flow 400 proceeds to build the page using XML data in steps 420-422. If the page does specifically request information to be retrieved in step 403 (e.g., an address for John Smith), then server 401 validates the request in step 402, determines the next page of the application to be displayed in step 411, accesses the data from the database in step 412, then builds the page in steps 420-422. This process is described in more detail with regard to FIGS. 5 and 6.

Figure 5:
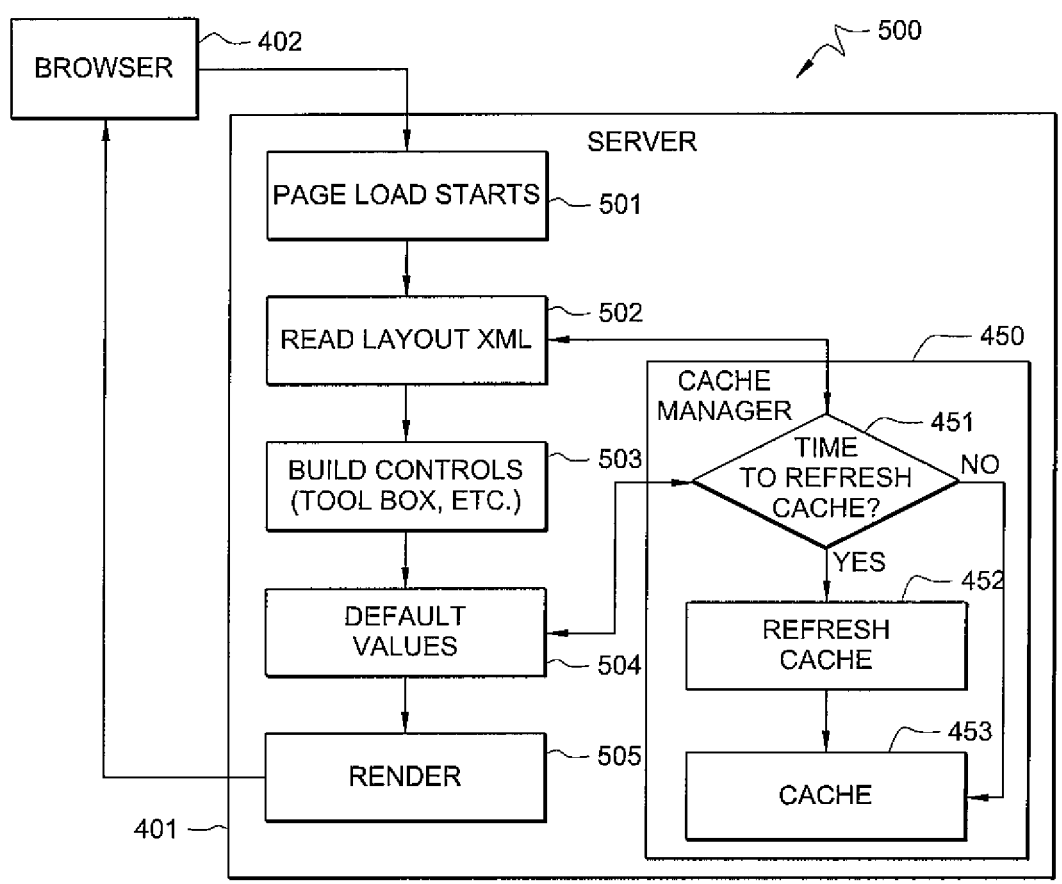
FIG. 5 is an illustration of an exemplary conceptual flow adapted according to one embodiment of the invention.

FIG. 5 is an illustration of exemplary conceptual flow 500 adapted according to one embodiment of the invention. In the scenario shown by FIG. 5, an end user requests a page that allows the entry of information, but does not specifically request any data from the database. For example, the requested page may allow the entry of a user address.

In step 501, the page load starts when the user enters the page request. In step 502, the runtime engine reads the layout XML to know how the page looks. In step 502, the runtime engine goes to cache manager 450 to retrieve the XML. Steps 451, 452, and 453 illustrate the intelligent caching technique discussed above. If it is time to refresh the cache, as determined in step 452, then server 401 updates the cache in step 452. If it is not time to refresh the cache, then the process proceeds to step 453 wherein the cache is accessed and the desired XML is retrieved.

After the desired XML is retrieved, then server 401 builds the controls in step 503, based at least in part on the configuration information in the retrieved XML. In step 504, server 401 retrieves the default values for the controls from cache manager 450. In step 505, server 401 renders the page by generating browser executable code and sending it to browser 402 to satisfy browser's 402 request.

Figure 6:
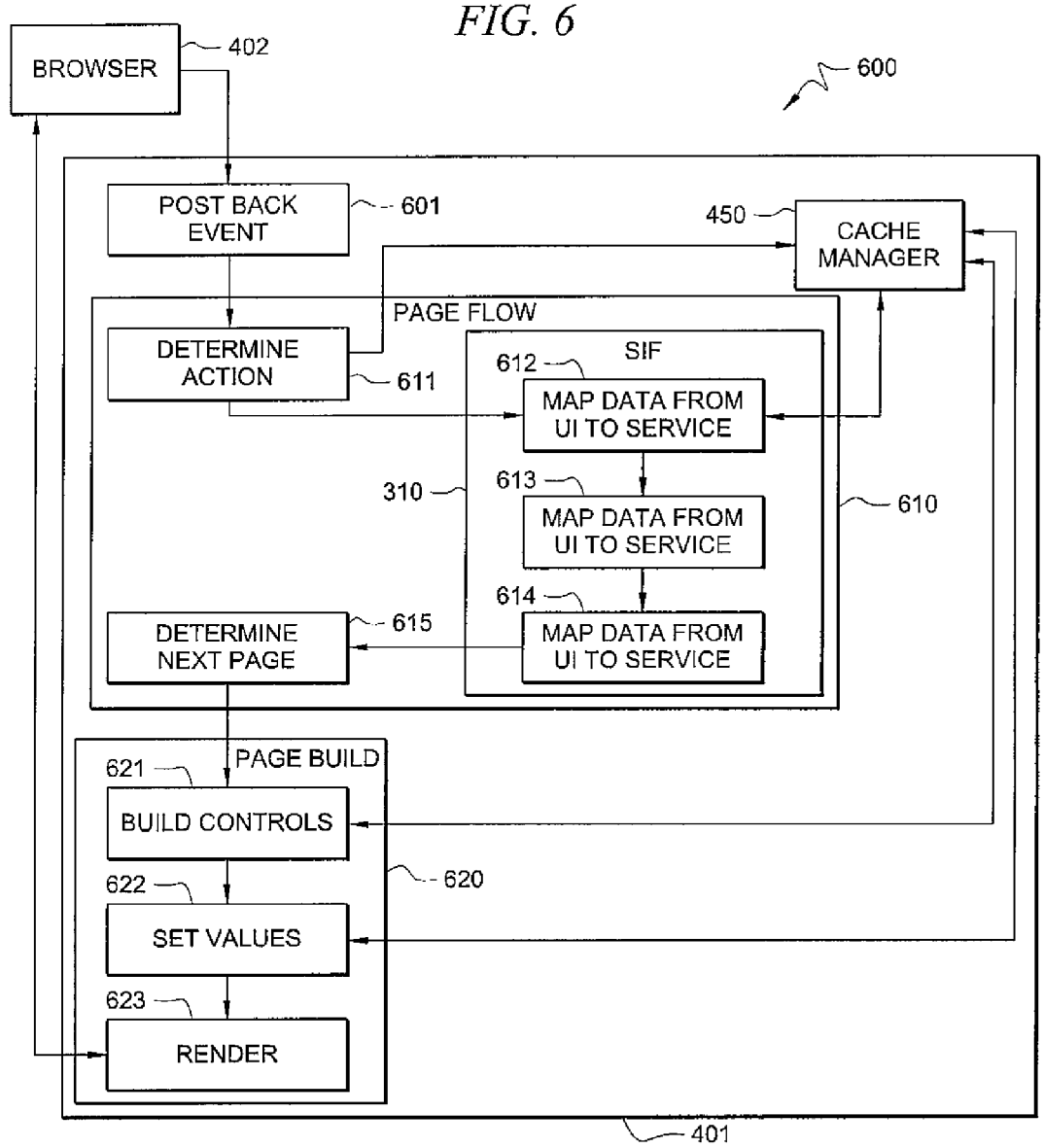
FIG. 6 is an illustration of an exemplary conceptual flow adapted according to one embodiment of the invention.

FIG. 6 is an illustration of exemplary conceptual flow 600 adapted according to one embodiment of the invention. In the scenario shown by FIG. 6, an end user requests a page that that includes specifically-identified information from the database. For example, the requested page may display a user address in one or more text boxes for modification by the end user. In requesting the page, the user may enter the name, "John Smith", thereby requesting the address information for John Smith to be displayed on the UI with various controls that allow modification of the data.

Step 601 is a post-back event, meaning that the end user has submitted information. Server 401 accesses page flow routine 610 to determine the appropriate action in step 611. Step 611 may be performed, e.g., by accessing navigation component 306 (FIG. 3) and cache manager 450. Step 611 determines that the entered information represents a query for the database. The runtime engine passes the entered information to SIF 310 (FIG. 3), which maps the data to a called web service (steps 612 and 613) and usually involves a call to cache manager 450 to access the requested information.

Returned data goes through SIF 310 back to the runtime engine of the UI in step 614. In step 615, the next page is determined e.g., by accessing navigation component 306.

Server 401 then accesses page build routine 620. Page build routine 620 builds the controls in step 621 and applies values (including default values and the requested information) in step 621. Steps 621 and 622 usually include accessing cache manager 450. In step 623, server 410 renders the page by generating browser executable code and sending it to browser 402 to satisfy the request by browser 402.

In some scenarios, the request for information by be malformed or there may be no information matching the end user's query. In such cases, flow 600 may render a page to the end user that indicates an error or no results.

FIGS. 7A-C is an illustration of exemplary XML data 700 adapted according to one embodiment of the invention. Data 700 is produced by a web application development environment in response to user interaction and can be transformed into browser executable code by a runtime engine or other component. FIGS. 7A-C include document portion 702 that defines the various controls for inclusion in the UI and layout section 703 that defines the layout of the UI (e.g., horizontal/vertical arrangement of the visual assets, background color, etc.).

Figure 8:
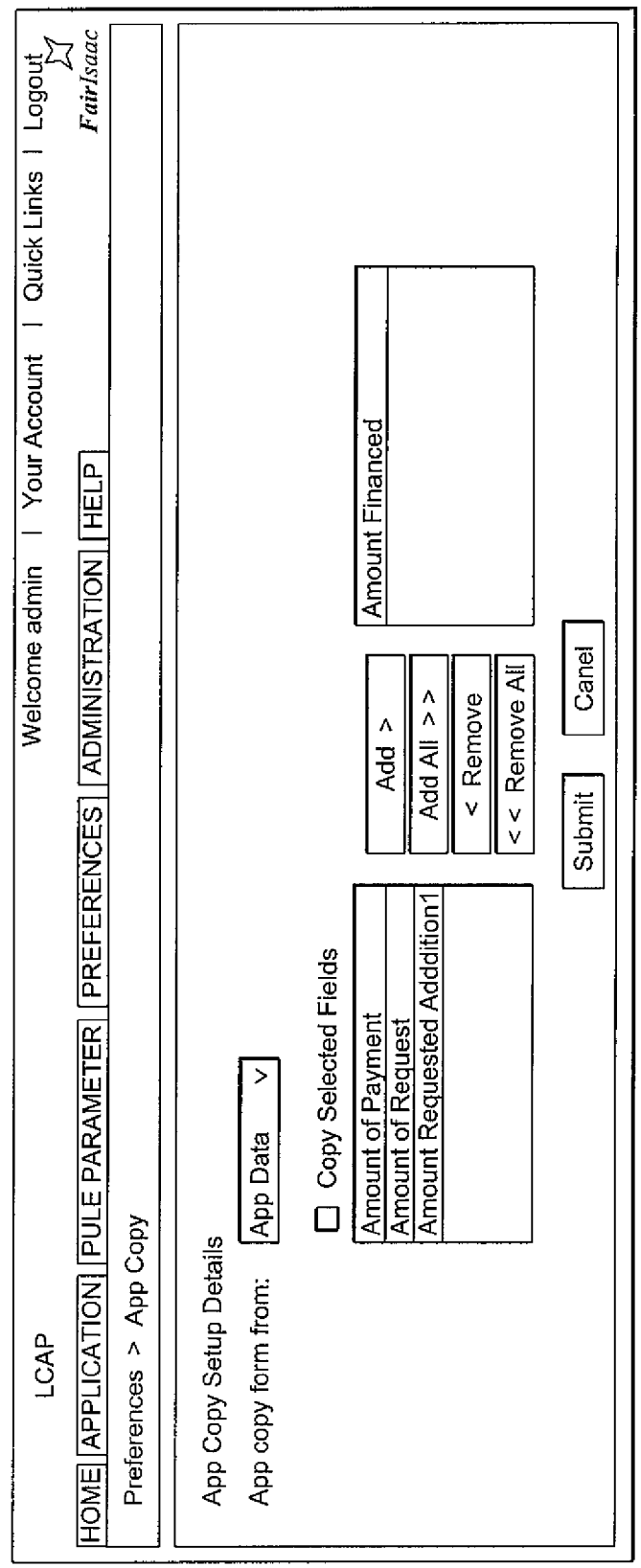
FIG. 8 is an illustration of an exemplary user interface adapted according to one embodiment of the invention.

FIG. 8 is an illustration of exemplary UT 800 adapted according to one embodiment of the invention. In this example, UI 800 is displayed by a browser in response to receiving executable code based on XML data 700. UI 800 represents one page of a web application, which may include other pages that are not shown herein for simplicity.

Various embodiments of the invention may provide one or more advantages over the prior art. For example, many prior art systems are adapted for an inefficient design and development process. In such prior art process, a designer generates the visual assets of a web application using an Integrated Development Environment, such as Front Page™, available from Microsoft Corporation. The designer's work is a mock-up, usually in HTML, and does not include the interactive functionality that is provided by .NET code or JAVA code. The mock-up is given to a developer to add the interactive functionality, and the developer usually starts from scratch. Since the developer begins from scratch, there will usually be some differences in the look and feel of the web application from the mock-up. The application then goes to the designer to fine tune the visual aspects and then goes back to the developer. The process may include a plurality of back-and-forth iterations. In other words, such prior art solutions generally require people with strong software development experience to modify a UI.

By contrast, various embodiments of the present invention include a web application development environment that can be used by a designer (or other person assumed to have little or no development skills or experience) to create the visual layout and interactive functionality of the web application. The web application development environment then generates XML data based on the user interaction. This XML data is used to generate browser executable code for end users.

In various embodiments, the designer writes no code, but instead, interacts with a GUI of the web application development environment to create the application. The web application development environment then generates XML data based on the user interaction. Later, a developer may fine tune the functionality using the same XML data that is generated by the designer. This quality can often eliminate any discrepancies between the designer's specified look and feel and the layout of the developer's version, while at the same time providing an intuitive tool for use by the designer.

Further, an application development environment according to one or more embodiments may provide increased consistency between created applications. For instance, a business that creates web applications for a variety of clients may start from scratch with each project, such that each finished product has a drastically different look and feel. By contrast, the business may employ a web application development environment according to one or more embodiments of the invention that includes pre-set visual aspects (e.g., background colors, corporate logos, copyright notices, etc.), architectural aspects, and functional aspects, thereby ensuring some amount of consistency among the created web applications.

Still further, some embodiments may provide advantages to the clients of the above-mentioned web application business. Specifically, some embodiments allow clients to participate directly in the design of the web applications that they purchase from the business. Additionally or alternatively, the clients may be able to modify their web applications after deployment without having to return to the business. Such embodiments may empower clients and offer greater efficiencies than prior art solutions, which often excluded clients from the design and modification processes.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 9:
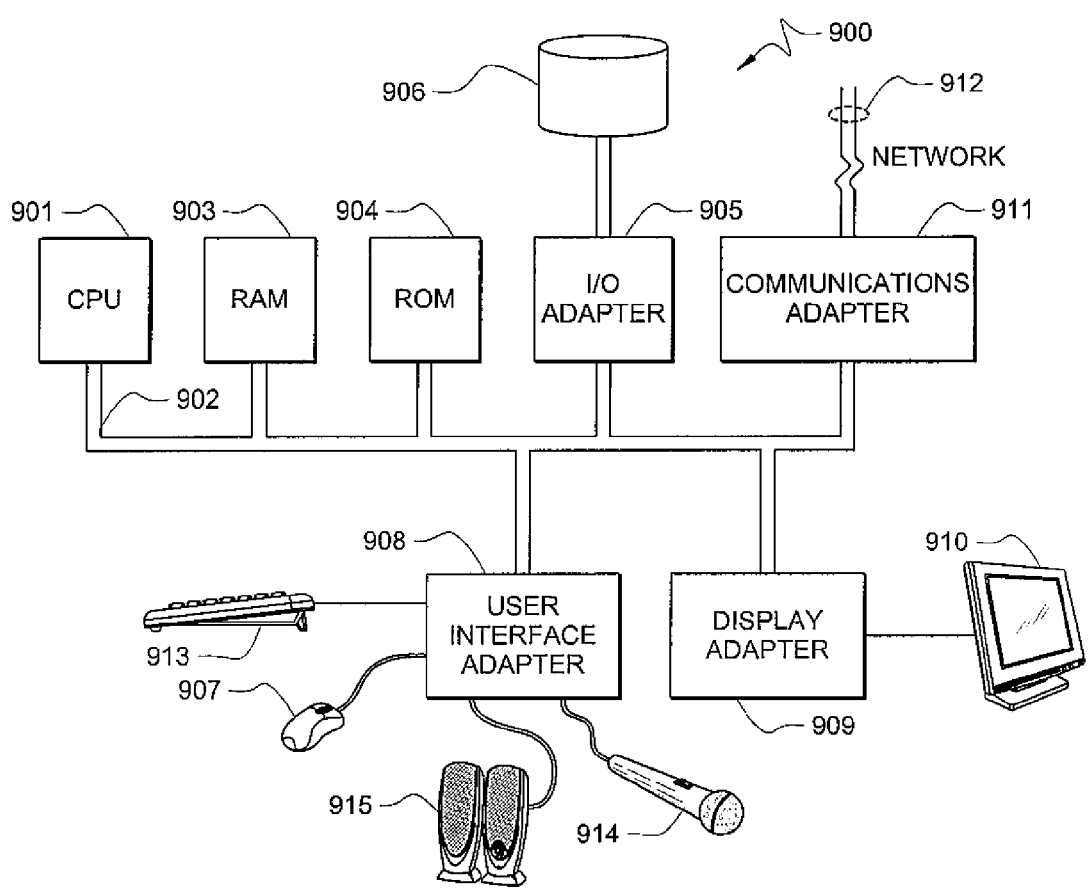
FIG. 9 illustrates an example computer system adapted according to embodiments of the present invention.

FIG. 9 illustrates an example computer system 900 adapted according to embodiments of the present invention. That is, computer system 900 comprises an example system on which embodiments of the present invention may be implemented (such as server 401 of the example implementation of FIGS. 4-6 and/or a computer running an application development environment). Central processing unit (CPU) 901 is coupled to system bus 902. CPU 901 may be any general purpose CPU. However, the present invention is not restricted by the architecture of CPU 901 as long as CPU 901 supports the inventive operations as described herein. CPU 901 may execute the various logical instructions according to embodiments of the present invention. For example, one or more CPUs, such as CPU 901, may execute machine-level instructions according to the exemplary operational flows described above in conjunction with FIGS. 2 and 4-6.

Computer system 900 also preferably includes random access memory (RAM) 903, which may be SRAM, DRAM, SDRAM, or the like. Computer system 900 preferably includes read-only memory (ROM) 904 which may be PROM, EPROM, EEPROM, or the like. RAM 903 and ROM 904 hold user and system data and programs, as is well known in the art.

Computer system 900 also preferably includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information, such as media selections.

I/O adapter 905 preferably connects to storage device(s) 906, such as one or more of hard drive, compact disc (CD) drive, floppy disk drive, tape drive, etc. to computer system 900. The storage devices may be utilized when RAM 903 is insufficient for the memory requirements associated with storing media data. Communications adapter 911 is preferably adapted to couple computer system 900 to network 912 (e.g., the Internet, a LAN, a cellular network, etc.). User interface adapter 908 couples user input devices, such as keyboard 913, pointing device 907, and microphone 914 and/or output devices, such as speaker(s) 915 to computer system 900. Display adapter 909 is driven by CPU 901 to control the display on display device 910 to, for example, display a GUI for a user to create a web application or to run a browser that displays a web application.

It shall be appreciated that the present invention is not limited to the architecture of system 900. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method executable by a central processing unit (CPU) for creating a web application the method comprising:
   receiving input via a Graphical User Interface (GUI), said input specifying visual assets and functional properties of a web application being created;
   generating, by a processor, web application data, said web application data comprising said visual sets aspects and said functional properties, wherein said web application data is selected from a list consisting of:
   Extensible Markup Language (XML) data;
   Cascading Style Sheets (CSS) data; and
   Extensible Stylesheet Language (XSL) data; and
   receiving a request from a browser for a page of said web application;
   accessing at least a portion of said application data in response to said received request;
   generating browser executable code from said at least a portion of application data;
   receiving configuration information from said requesting browser;
   storing said configuration information on a configuration information database;
   caching at least a portion of said configuration information in an intelligent caching module; and
   updating the web application according to one or more settings retrieved from the intelligent caching module, wherein the one or more settings optimize runtime engine performance against web application update rate; and
   receiving a query from said browser, said query for specified information in the database;
   validating a format of said query;
   calling web services to access said specified information;
   determining a web page to display to said browser in response to said query;
   determining a layout for said web page;
building said web page with said specified information;
   transmitting the browser executable code and the web application update to a browser in response to a request for the web application received from the browser to the runtime engine.

2. The method of claim 1 further comprising: publishing said web application to a web server.

3. The method of claim 1 further comprising:
   accessing said configuration information database at a predetermined frequency to update said cache.

4. A system for creating a web application, said system comprising:
   a processor for generating web application data in a markup type language that describes specified visual properties and actions of the web application, wherein said web application data is selected from a list consisting of:
   Extensible Markup Language (XML) data;
   Cascading Style Sheets (CSS) data; and
   Extensible Stylesheet Language (XSL) data; and
   the generating is based on user input received at a graphical user interface;
      a runtime engine coupled to said processor executing on a webserver and operable to:
   receive said web application data and to convert said web application data from said markup type language to a browser executable code that specifies the visual properties and actions of the web application,
   update the web application according to one or more settings retrieved from an intelligent caching module, wherein the one or more settings optimize runtime engine performance against web application update rate; and
   receive a query from said browser, said query for specified information in a database;
   validate a format of said query;
   call web services to access said specified information;
   determining a web page to display to said browser in response to said query;
   determine a layout for said web page;
   build said web page with said specified information;

transmit the browser executable code and the web application update to a browser in response to a request for the web application received from the browser to the runtime engine.

5. The system of claim 4 wherein said user interface receives further user interaction specifying logical flow properties of said web application, and wherein said data unit generates application data describing the specified logical flow of the web application.

6. The system of claim 4 wherein said browser executable code is selected from the list consisting of: Hypertext Markup Language (HTML) data; JAVA code; JavaScript.

7. The system of claim 4 wherein said web application is a multi-page application that includes navigation logic and validation logic for information entered at a browser.

8. The system of claim 4 wherein said user interface and said data unit are software units executed by one or more computers.

9. The system of claim 4, wherein said intelligent caching module comprises a caching component operable to define a frequency of access of said one or more databases by said runtime engine.

10. A computer program product stored in a non-transitory computer readable medium having computer program logic recorded thereon, said computer program product comprising:
    code, when executed by a computer, for
    generating a Graphical User Interface (GUI) and web application data;
    interacting with a user through said GUI, allowing said user to specify visual assets and functional properties of a web application being created, wherein said web application data is selected from a list consisting of:
    Extensible Markup Language (XML) data;
    Cascading Style Sheets (CSS) data; and
    Extensible Stylesheet Language (XSL) data; and
    generating application data based on said interaction, said application data defining said application, including said visual assets and said functional properties;
    receiving a request from a browser for a page of said web application;
    accessing a portion of said application data in response to said received request;
    generating browser executable code from said portion of application data;
    receiving configuration information from said requesting browser;
    storing said configuration information on a configuration database;
    caching at least a portion of said configuration information for use when needed by said generating browser executable code;
    updating the web application according to one or more settings retrieved from an intelligent caching module, wherein the one or more settings optimize runtime engine performance against web application update rate; and receiving a query from said browser, said query for specified information in the database;
    validating a format of said query;
    calling web services to access said specified information;
    determining a web page to display to said browser in response to said query;
    determining a layout for said web page;
    building said web page with said specified information;

transmitting the browser executable code and the web application update to a browser in response to a request for the web application received from the browser to the runtime engine.

11. The computer program product of claim 10 further comprising: code, when executed by a computer, providing a runtime engine for said web application.

12. The computer program product of claim 10 further comprising:
    code, when executed by a computer, receiving a request from a browser for a page of said web application;
        code, when executed by a computer, accessing a portion of said application data in response to said received request;
        code, when executed by a computer, generating browser executable code from said portion of application data; and
        code, when executed by a computer, transmitting said browser executable code to said requesting browser.

13. The computer program product of claim 12 wherein said code accessing a portion of application data comprises:
    code, when executed by a computer, determining whether to update cache from an associated database.

14. The computer program product of claim 10 further comprising:
    code, when executed by a computer, receiving a query from a browser, said query for specified information in a database;
        code, when executed by a computer, validating a format of said query;
        code, when executed by a computer, calling web services to access said specified information;
        code, when executed by a computer, determining a web page of said application to display to said browser in response to said query;
        code, when executed by a computer, determining a layout for said web page;
        code, when executed by a computer, building said web page with said specified information;
        code, when executed by a computer, transmitting browser executable code to said browser, said browser executable code representing said built web page.

15. The computer program product of claim 10 wherein said functional properties comprise items selected from the list consisting of: validation of input received from a browser; and navigation among pages of said web application.

16. The computer program product of claim 10 further comprising:
    code, when executed by a computer, accessing said configuration information database at a predetermined frequency to update said cache.

17. A web application development system, the system comprising: a central processing unit (CPU) and a memory coupled to the CPU for creating the web application:
    a user interface subsystem receiving user input, the user input relating to one or more specifications for a web application, and generating web application data based on the received user input, the web application data comprising the one or more specifications for the web application, wherein said web application data is selected from a list consisting of:
    Extensible Markup Language (XML) data;
    Cascading Style Sheets (CSS) data; and
    Extensible Stylesheet Language (XSL) data; and
    a runtime engine receiving the XML data comprising the one or more specifications for the web application from the user interface subsystem, generating browser executable code based on data extracted from the XML data, transmitting the browser executable code to a browser in response to a request for the web application received from the browser to the runtime engine, updating the web application according to one or more settings,
 wherein the one or more settings optimize runtime engine performance against web application update rate; and receiving a query from said browser, said query for specified information in a database;

validating a format of said query;

calling web services to access said specified information;

determining a web page to display to said browser in response to said query;

determining a layout for said web page;

building said web page with said specified information;
 a browser receiving the updated web application and the browser executable code from the runtime engine in response to a request for the web application transmitted from the browser to the runtime engine, executing the browser executable code, and displaying the web application according to the executed browser executable code.

18. A web application development system, the system comprising: a central processing unit (CPU) and a memory coupled to the CPU for creating the web application:
 a runtime engine within a web tier, the runtime engine comprising:
 a layout module for receiving web application data relating to visual specifications for a web application and generating browser executable code from the received web application data, wherein said web application data is selected from a list consisting of:

Extensible Markup Language (XML) data;

Cascading Style Sheets (CSS) data; and

Extensible Stylesheet Language (XSL) data; and
 a validation module comprising a first XML file for determining if the received XML data is within an acceptable range of values;

an intelligent caching module providing settings that define when the runtime engine accesses a database that stores runtime engine configuration information;

a navigation module comprising a second XML file specifying the ordering of pages and actions comprising the web application;

a service invocation framework bridging the web tier and an application tier; and mapping the web tier to specific web services provided by the application tier, the application tier comprising:

a web services module accessing the database on behalf of the web tier; and a data access module conforming the database accesses to a corresponding database platform that is being accessed; and a database tier comprising:

the database accessed by the application tier, and configured to include metadata for the web application; and
 receive a query from said web tier, said query for specified information in the database;

validate a format of said query;

call the web services to access said specified information;
 determining the web tier to display to said browser in response to said query;

determining a layout for a web page;

building said web page with said specified information.

* * * * *

UNITED STATES PATENT AND TRADEMARK OFFICE
CERTIFICATE OF CORRECTION

PATENT NO. : 8,549,472 B1
APPLICATION NO. : 11/761681
DATED : October 1, 2013
INVENTOR(S) : Prakash Tilwani Page 1 of 1

It is certified that error appears in the above-identified patent and that said Letters Patent is hereby corrected as shown below:

In the Specification:
    At column 7, line number 37, delete "UT" and replace with --UI--.

In the Claims:
    At column 9, claim number 1, line number 67, delete "Stylesheet" and replace with --Stylesheet--.

Signed and Sealed this
Seventeenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,549,472 B1 | Page 1 of 1 |
| APPLICATION NO. | : 11/761681 | |
| DATED | : October 1, 2013 | |
| INVENTOR(S) | : Prakash Tilwani | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1495 days.

Signed and Sealed this
Tenth Day of March, 2015

Michelle K. Lee
*Deputy Director of the United States Patent and Trademark Office*